United States Patent
Chang

(10) Patent No.: US 9,917,719 B2
(45) Date of Patent: Mar. 13, 2018

(54) APPARATUS AND METHOD FOR REMOTE BEAM FORMING FOR DBS SATELLITES

(71) Applicant: SPATIAL DIGITAL SYSTEMS, INC., Camarillo, CA (US)

(72) Inventor: Donald C. D. Chang, Thousand Oaks, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 300 days.

(21) Appl. No.: 14/335,945

(22) Filed: Jul. 21, 2014

(65) Prior Publication Data

US 2015/0016240 A1   Jan. 15, 2015

Related U.S. Application Data

(63) Continuation of application No. 13/291,594, filed on Nov. 8, 2011, now Pat. No. 8,817,694, which is a
(Continued)

(51) Int. Cl.

| H04L 12/28 | (2006.01) |
| H04L 27/26 | (2006.01) |
| H04B 7/204 | (2006.01) |
| H04N 7/20 | (2006.01) |
| H04B 7/185 | (2006.01) |

(Continued)

(52) U.S. Cl.
CPC ......... *H04L 27/265* (2013.01); *H04B 7/1851* (2013.01); *H04B 7/2041* (2013.01); *H04N 7/20* (2013.01); *H04W 16/14* (2013.01)

(58) Field of Classification Search
USPC .................. 370/210, 316, 252, 386, 486
See application file for complete search history.

(56) References Cited

U.S. PATENT DOCUMENTS

| 6,359,923 B1 * | 3/2002 | Agee ..................... H04B 1/69 370/342 |
| 7,372,911 B1 * | 5/2008 | Lindskog ............. H04B 7/0617 375/267 |

(Continued)

*Primary Examiner* — John Pezzlo

(57) ABSTRACT

A satellite broadcasting system is achieved where remote beam forming processors combined with wavefront multiplexers located among distributed ground stations are used to control downlink beam footprints and pointing directions. Digital beam forming (DBF) techniques allow a single satellite download broadcast antenna array to generate multiple independently pointed simultaneous downlinks, which may contain distinct information content. Allocation of some uplink back-channel elements as diagnostic signals allows for continuous calibration of uplink channels, improving downlink broadcast array and user broadcast performance. Wavefront multiplexing/demultiplexing allows all array element signals to be radiated by the broadcasting antenna array, with simultaneous propagation from ground stations to the broadcasting satellites through available parallel propagation channels in the uplinks of feeder links, with equalized amplitude and phase differentials. Further, additional wavefront multiplexing/demultiplexing pairs are further used to coherently broadcast signals from a remote beam forming facility on ground to cover areas through multiple broadcasting satellites.

20 Claims, 11 Drawing Sheets

Related U.S. Application Data continuation-in-part of application No. 12/122,462, filed on May 16, 2008, now Pat. No. 8,098,612.

(60) Provisional application No. 60/930,943, filed on May 21, 2007.

(51) Int. Cl.
*H04W 16/14* (2009.01)
*H04J 1/16* (2006.01)

(56) References Cited

U.S. PATENT DOCUMENTS

2002/0159506 A1* 10/2002 Alamouti ............ H04B 7/0617
  375/147
2004/0001554 A1* 1/2004 Sun .................... H04L 27/2647
  375/260

* cited by examiner

APPARATUS AND METHOD FOR REMOTE BEAM FORMING FOR DBS SATELLITES

This application is a continuation of application Ser. No. 13/291,594, filed Nov. 8, 2011, which is continuation-in-part of application Ser. No. 12/122,462, filed on May 16, 2008, now U.S. Pat. No. 8,098,612, which claims the benefit of provisional application No. 60/930,943, filed on May 21, 2007.

BACKGROUND OF THE INVENTION

1. Field of the Invention

The present invention relates to satellite-based broadcasting systems. More particularly, it relates to systems for downlinking broadcast content data from satellites that are linked to ground-based uplink stations having remote beamforming capability. Additionally, the present invention relates to coherent power combining techniques for downlinking various broadcast data streams over a common coverage area from multiple satellites that are linked to a ground-based uplink station.

2. Description of Related Art

Systems for broadcasting audio and video data from satellites in geostationary orbit (GEO), medium-Earth orbit (MEO), and low-Earth orbit (LEO) to ground-based users are well known in the art. Such systems generally rely on one or more ground-based uplink facilities to uplink content to the satellite. The satellite then downlinks the content to individual users in selected geographical areas. Some systems employ shaped reflectors to develop a downlink beam pattern to illuminate the selected region. Others employ multiple antennas or antennas with multiple elements in order to configure the footprint of the downlink beams.

However, nearly all of such systems are fixed at the time the satellite is launched and cannot be upgraded to keep pace with more advanced ground systems. Even those systems that maintain some satellite configurability must be controlled by complex systems on board the satellite and thus have inherently limited flexibility. Thus, it would be useful to provide a system with a radiation pattern that can be configured and controlled by ground-based uplink stations. In particular, it would be useful to provide a system that uses remote ground-based digital beam forming (DBF) systems to cause direct-broadcast satellites to radiate multiple downlink beams with configurable shapes pointing in configurable directions.

SUMMARY OF THE INVENTION

A satellite broadcasting system is achieved that provides multiple simultaneous downlinks controlled by remote digital beam forming (DBF) processors employed at distributed, ground-based uplink stations. The system enables the formation of configurable downlink radiation patterns covering selected service areas, enables the use of multiple simultaneous downlinks that may carry different content to different geographic regions, and minimizes the impact of differential phase and amplitude drift between uplink signal elements.

An embodiment of a satellite broadcasting system in accordance with the present invention includes a satellite segment, a ground segment, and a user segment. The satellite segment includes one or more satellites having a downlink broadcast antenna array. An embodiment of such a downlink broadcast antenna array having ten radiating elements is described in detail below, but more generally, the downlink broadcast antenna array comprises N elements, where N is a positive integer greater than one.

The satellite segment also includes a wavefront de-multiplexer having at least N outputs configured to drive corresponding ones of the N downlink broadcast antenna array elements. The wavefront de-multiplexer is a device with M inputs and M outputs, where M is an integer greater than or equal to N and configured to perform a spatial Fourier transform of its inputs. N of the M transformed outputs are used to drive the N downlink broadcast antenna array elements. If M is greater than N, the remaining M−N outputs of the wavefront de-multiplexer are used to drive an optional cost-function unit that is adapted to measure imbalances in uplink back-channels used to uplink audio, video or other content to the satellite segment for subsequent downlink to the user segment. The operation of the optional cost function unit is described in more detail below.

The wavefront de-multiplexer can be implemented in a number of ways, including by employing an M-by-M Butler Matrix, well known in the art. In the detailed description that follows, a system is described that uses a 16-by-16 Butler Matrix, but more generally, an M-by-M Butler Matrix may be used where M is an integer greater than or equal to N. The inputs to the M-dimensional wavefront de-multiplexer are produced by a frequency-domain de-multiplexer that operates on frequency-domain multiplexed (FDM) uplink signals received from the ground segment. The FDM signals from the ground segment are de-multiplexed into M components, and each of the M components is frequency converted to a selected downlink frequency for subsequent transmission over the downlink broadcast antenna array.

The ground segment comprises one or more ground terminals for uplinking audio, video, or other content to the satellite segment for subsequent downlink to the user segment. An embodiment of a ground terminal in accordance with the present invention includes at least one digital beam forming (DBF) processor that is configured to encode amplitude and phase information onto a data stream such that a coherent beam is formed by the downlink broadcast antenna of the satellite segment. A stream of baseband content data is multiplied by an N-component beam weight vector (BWV) to create an N-component product vector. An embodiment described in detail below uses a ten-component BWV corresponding to the ten elements of the downlink broadcast antenna array in that embodiment. However, more generally, a system including an N-element downlink broadcasting antenna array on a broadcast satellite will use N-component BWVs to properly weight baseband content data.

The N-component product vector is then padded with nulls to create an M-component product vector, where M is an integer greater than or equal to N. For example, in an embodiment described in detail below, M is sixteen and N is ten. The M-component product vector, consisting of N signals and M−N nulls, is then processed by an M-by-M wavefront multiplexer that performs an M-component spatial Fourier transform. The M-component output of the wavefront multiplexer is then passed through M analog-to-digital converters to produce M analog waveforms. Each of the M analog waveforms is frequency up-converted to a different frequency near the selected uplink frequency. In an embodiment described in detail below, the uplink center frequency is selected to be 6 GHz, and the sixteen analog waveforms are up-converted to frequencies spaced by 62.5 MHz and extending from 5.5 GHz to 6.5 GHz. More generally, however, the center frequency can be selected to be any frequency known to be useful for satellite communications, such as S-band, C-band, X-band, Ku-band, or Ka-band. The spacing between the frequencies likewise may be selected according to the bandwidth requirements of the application.

The M up-converted signals are then combined into frequency-domain multiplexed (FDM) uplink signals, and these uplink signals are transmitted as back-channel signals to the satellite segment through a feeder link at C-band, in this embodiment. After processing through the satellite segment as described previously, the signals encoded with the BWV are applied to the elements of the downlink broadcast antenna array. The amplitude and phase profiles encoded in the BWV create a beam that adds coherently in a particular direction and that exhibits a particular pattern shape. Changing the BWV coefficients applied by the ground segment thus changes the pointing of the downlink from the satellite segment. Within the ground segment, multiple content streams may be multiplied by multiple BWVs to create multiple beams when the signals are subsequently applied to the satellite segment downlink broadcast antenna array. Thus, the ground segment controls the pointing and shaping of multiple simultaneous beams downlinked from the satellite segment.

For the case in which M is chosen to be larger than N such that the N-component product vector created in the ground segment is padded by one or more nulls, the cost function unit mentioned above allows calibration and monitoring of the uplink channel, enabling improved downlink performance of the system. When the back-channel signals embedded in the uplinked beam is received and amplified by the satellite system, frequency converted to the broadcast frequency (typically Ku or S band), and run through the wavefront de-multiplexer, the original N data streams (each modulated by corresponding components of the BWV) are recovered, including the M−N null channels. For a completely balanced feeder link with multiple back channels having identical propagation delays and attenuations, the M−N recovered channels will contain no signals. However, in reality, imbalances and differential propagation characteristics among various channels will cause some energy to leak into the null outputs of the wavefront de-multiplexer. By monitoring the null channels, changes can be made dynamically to the amplitudes and phases of the signals entering the wavefront de-multiplexer to correct for these imbalances and to produce true nulls where expected. Alternatively, the null energy monitored by the cost function unit can be downlinked back to the ground segment via a separate backchannel, and the ground segment can accordingly pre-compensate for the measured imbalances by adjusting the amplitudes and phases of the signals emerging from the wavefront multiplexer on the ground segment. Thus, the use of one or more null channels in the uplink enables continuous calibration and monitoring of the uplink channel, assuring that the downlink beams are formed properly and cleanly.

By contrast, without the wavefront multiplexing feature provided by the present invention, each weighted element signal would propagate through a unique backchannel in the feeder link. The differential propagation characteristics of each channel would modulate the weighted element signals differently in both amplitude and phase. Depending on the frequency band of the feeder link, these effects could significantly distort the shape of the broadcast beam.

The wavefront multiplexing scheme, however, directs each of the N weighted element signals generated by the remote beam-forming facility on the ground to go through all of the M propagation channels simultaneously and in parallel. Thus, the channel effects are spread across the entire feeder link bandwidth and across all of the N weighted element signals, reducing the potential distortion effects by a factor of the square root of M, or four for the example discussed below having M equal to sixteen.

From the foregoing discussion, it is clear that certain advantages have been achieved for a satellite broadcast system that utilizes ground-based remote digital beam forming. Further advantages and applications of the invention will become clear to those skilled in the art by examination of the following detailed description of the preferred embodiment. Reference will be made to the attached sheets of drawing that will first be described briefly.

DETAILED DESCRIPTION OF THE PREFERRED EMBODIMENT

The invention provides a direct satellite broadcast system that includes a remote ground-based beam-forming facility. Beam-forming information is encoded into audio, video, or other content within the ground-based uplink facility. It is then uplinked to one or more satellites and downlinked via a segmented downlink broadcast antenna array. Beam-forming information encoded on the ground creates multiple downlink beams appearing at the satellite's downlink broadcast antenna array, allowing control over which content is radiated to which ground-based users.

Figure 1:
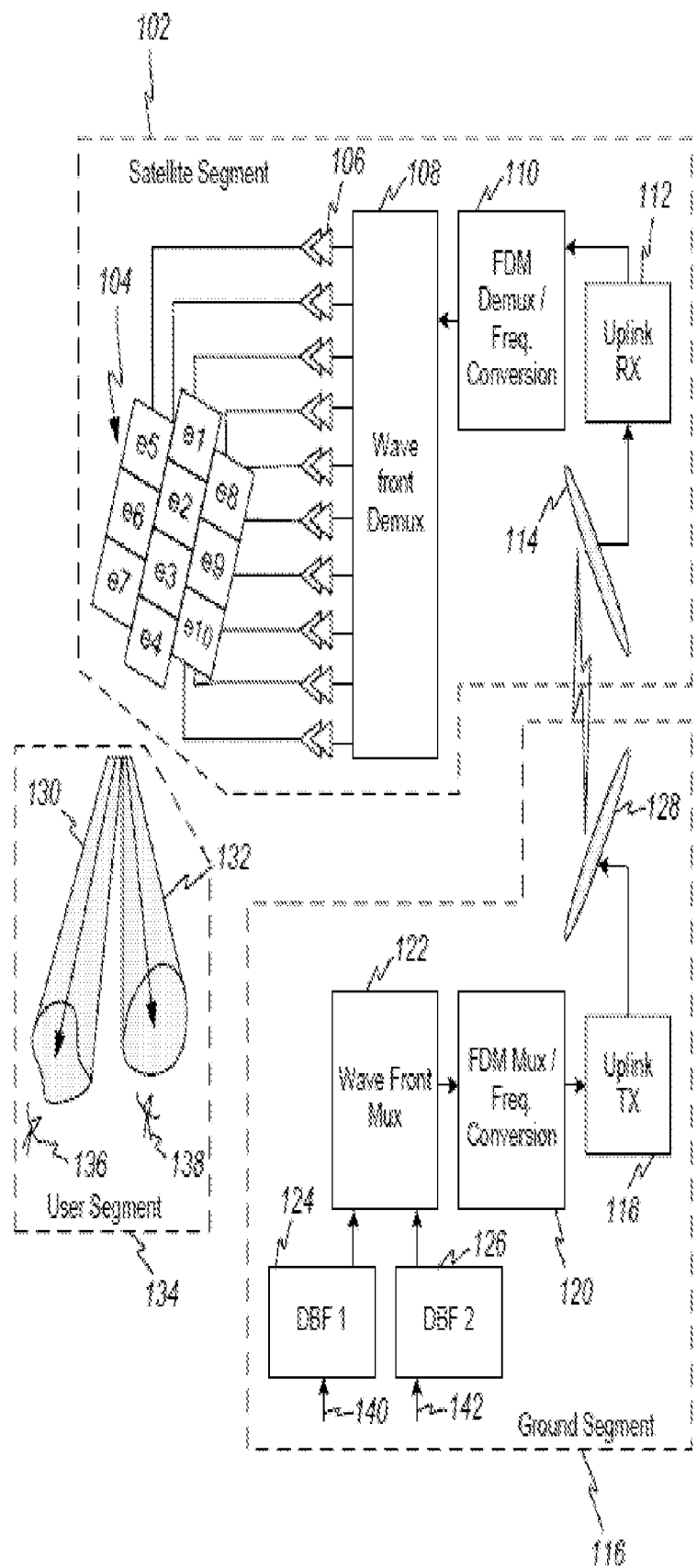
FIG. 1 depicts a direct broadcast system comprising a ground segment, a satellite segment, and a user segment in accordance with the present invention.

FIG. 1 depicts a block diagram of a direct broadcast system in accordance with the present invention. The ground segment 116 includes a first digital beam forming (DBF) processor 124 and a second DBF processor 126. Content data 140 enters the first DBF processor 124, and content data 142 enters the second DBF processor 126. The two content streams may be identical or may be distinct, depending on the particular broadcast application. The first DBF processor applies a set of beam weight vectors (BVWs) to the content data 140 that correspond to a particular selected footprint for a first beam 130 that will be downlinked from the satellite segment 102. The second DBF processor 126 similarly applies an independent set of BWVs to the content data 142 that correspond to a separate distinct footprint for a second beam 132 that will be downlinked by the satellite segment 102. The content data, now encoded with beam footprint and pointing information, is sent to a wavefront multiplexer 122. The wavefront multiplexer 122, described more fully with respect to FIG. 2 below, performs a spatial Fourier transform (FT) of the encoded content data to produce multiple baseband uplink signals. The multiple baseband signals are then frequency up-converted 120 to several closely-spaced uplink carriers and combined into a composite frequency-domain multiplexed (FDM) uplink signal. To save bandwidth, two FDM multiplexers may be used to create two half-bandwidth streams, each with an orthogonal polarization such as vertical and horizontal linear polarization, or right-hand circular polarization (RHCP) and left-hand circular polarization (LHCP). The uplink signal is then amplified 118 and radiated to one or more satellites via an uplink antenna 128. It should be noted that while the above description refers to a ground segment including two DBF processors for encoding two content data streams, other numbers of DBF processors are possible and would fall within the scope and spirit of the present invention.

The satellite segment 102 receives the uplinked FDM signal via an uplink receive antenna 114. The uplink signal is amplified 112 and sent through an FDM receiver 110 that de-multiplexes the closely spaced carriers and frequency converts them to the satellite segment downlink frequency. The de-multiplexed and frequency-converted signals are then passed through a wavefront de-multiplexer 108, described more fully with respect to FIG. 3 below, that performs a spatial FT of the received signals. The outputs of the wavefront de-multiplexer 108 are amplified 106 and routed to elements of a downlink broadcast antenna array 104. The BWVs that were encoded into the two beams by the ground segment facility 116 operate to generate two independent downlink beams 130 and 132 in the user segment 134. The footprints of the two downlink beams 130 and 132 can be controlled by the ground segment 116 to illuminate geographically separated users 136 and 138. The ground segment 116 can also control which digital content is sent to user groups 136 and 138 by varying the inputs 140 and 142 to the two DBF processors 124 and 126.

It should be noted that while the embodiment described above employed two DBF processors to encode two uplink content streams, more than two DBF processors and content streams may also be used to create more than two downlink beams. Such systems employing multiple DBF processors would also fall within the scope and spirit of the present invention.

Figure 2:
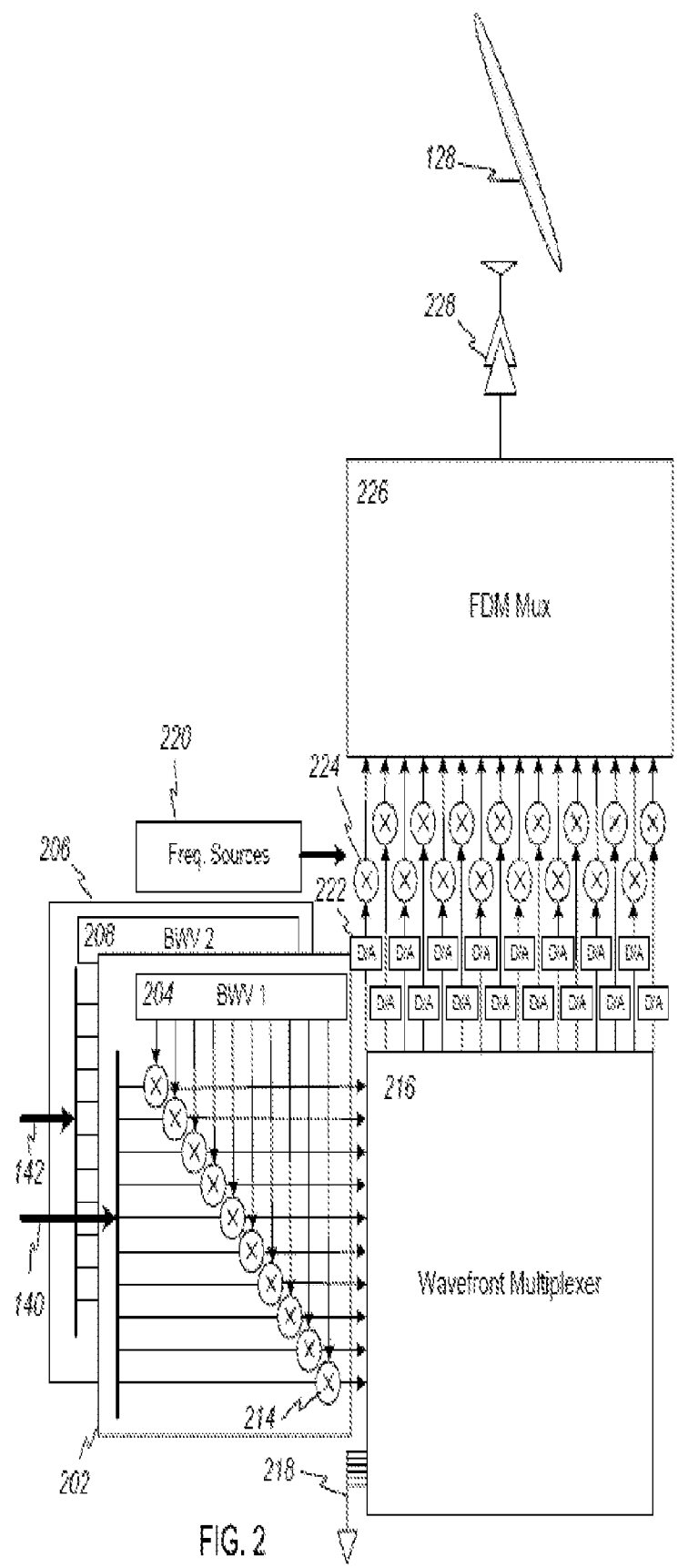
FIG. 2 is a block diagram of an embodiment of the ground segment of a satellite broadcast system in accordance with the present invention.

FIG. 2 presents a more detailed block diagram of an embodiment of a ground segment portion of a digital broadcast system in accordance with the present invention. The two content data streams 140 and 142 are depicted as inputs to a first DBF processor 202 and a second DBF processor 206. In the embodiment depicted in FIG. 2, the digital content stream 140 is split into ten portions that are multiplied by components of a ten-dimensional first BWV 204. Each of the ten components of the first BWV 204 is a complex number containing both an amplitude piece and a phase piece. The specific values of the BWV are chosen to create a particular beam footprint from the downlink transmission antenna of the satellite segment, as will be more fully described below with reference to FIG. 3. The content data stream 140 is multiplied 214 by the first set of BWVs 204, and the encoded contents are then routed to a wavefront multiplexer 216.

At the same time, the second input content stream 142 is multiplied by a second set of BWVs 208 in the second DBF processor 206 to create an independent second beam in the satellite segment. Note that altering the values of the second set of BWVs 208 will change the footprint and pointing direction of the second beam generated by the satellite segment but will not have an effect on the first beam. After multiplication by the second BWV 208, the outputs of the second DBF 206 are combined with those of the first DBF 202 on an element-by-element basis, and the combination is routed to the inputs of the wavefront multiplexer 216.

The wavefront multiplexer 216 takes the input elements, encoded with amplitude and phase pointing data, and performs a spatial Fourier transform (FT). The wavefront multiplexer 216 can be implemented in many ways, such as by a sixteen-by-sixteen Butler Matrix, well known in the art. Note that for the embodiment depicted in FIG. 2, only ten of the inputs of the wavefront multiplexer 216 are used while all sixteen outputs are used. The remaining six inputs are set to null inputs, as shown schematically at 218. As will be described in more detail below with reference to FIG. 3, the zero-input channels will allow for continuous calibration, equalization, and optimization of the dynamic propagation effects of the uplink back-channels in the feeder link, enabling improved system performance Wavefront multiplexers of sizes other than sixteen by sixteen may also be used, different numbers of unused inputs may also be employed, and continuous calibration may be performed as long as the number of wavefront multiplexer signal inputs is less than the number of outputs. In more general terms, the number of signal inputs to the wavefront multiplexer will be N, and the number of outputs will be M, where N and M are positive integers greater than one. When M is greater than N, continuous calibration techniques may be used, as the number of null inputs to the wavefront multiplexer will be M−N. The downlink broadcasting antenna array 104 will comprise N elements, corresponding to the N signal inputs to the wavefront multiplexer. Such alternately sized systems would also fall within the scope and spirit of the present invention.

By forming a Fourier transform, the wavefront multiplexer has the effect of mixing each of the ten inputs into each of the sixteen outputs. Thus, each of the ten input element signals goes through all of the sixteen output channels, and each of the zero-input channels also goes through all of the sixteen output channels. In the subsequent ground processing, uplinking to the satellite element, and processing in the satellite, portions of the null-input signals thus sample each of the sixteen uplink channels and can be used to correct for dynamic channel-specific propagation effects and imbalances.

The outputs of the wavefront multiplexer 216 are run through digital-to-analog converters 216 that synthesize analog waveforms. The analog waveforms are then frequency up-converted 224 by a series of closely spaced carrier frequencies in the feeder-link uplink frequency band and generated by frequency sources 220. The uplink frequency may be any frequency spectrum useful for satellite communications, such as S-band, C-band, X-band, Ku-band, or Ka-band. For purposes of illustration, the uplink will be assumed to be C-band at 6 GHz. The sixteen output channels are then frequency up-converted by sixteen carriers separated by 62.5 MHz and extending from 5.75 GHz to 6.25 GHz. Other channel spacings can be used depending on the bandwidth requirements of the application. The separate carriers are then combined into two 500-MHz-wide C-band signals by low-loss frequency-domain multiplexers (FDMs) 226. The FDM carrier is then amplified 228 by a solid-state power amplifier, traveling wave-tube amplifier (TWTA), klystron, or other radio-frequency amplifier known in the art, and transmitted via an uplink transmit antenna 128. The two 500-MHz C-band signals are uplinked to the designated satellite using polarization diversity. For example, one signal may be horizontally polarized and the other vertically polarized. Or one may be right-hand circularly polarized (RHCP) and the other left-hand circularly poralized (LHCP).

Note that the ground segment described above may operate by itself or in conjunction with multiple ground segments having similar configurations. As long as their uplink frequencies are separated, multiple ground segments can be used to uplink content to the same satellite or group of satellites.

Figure 3:
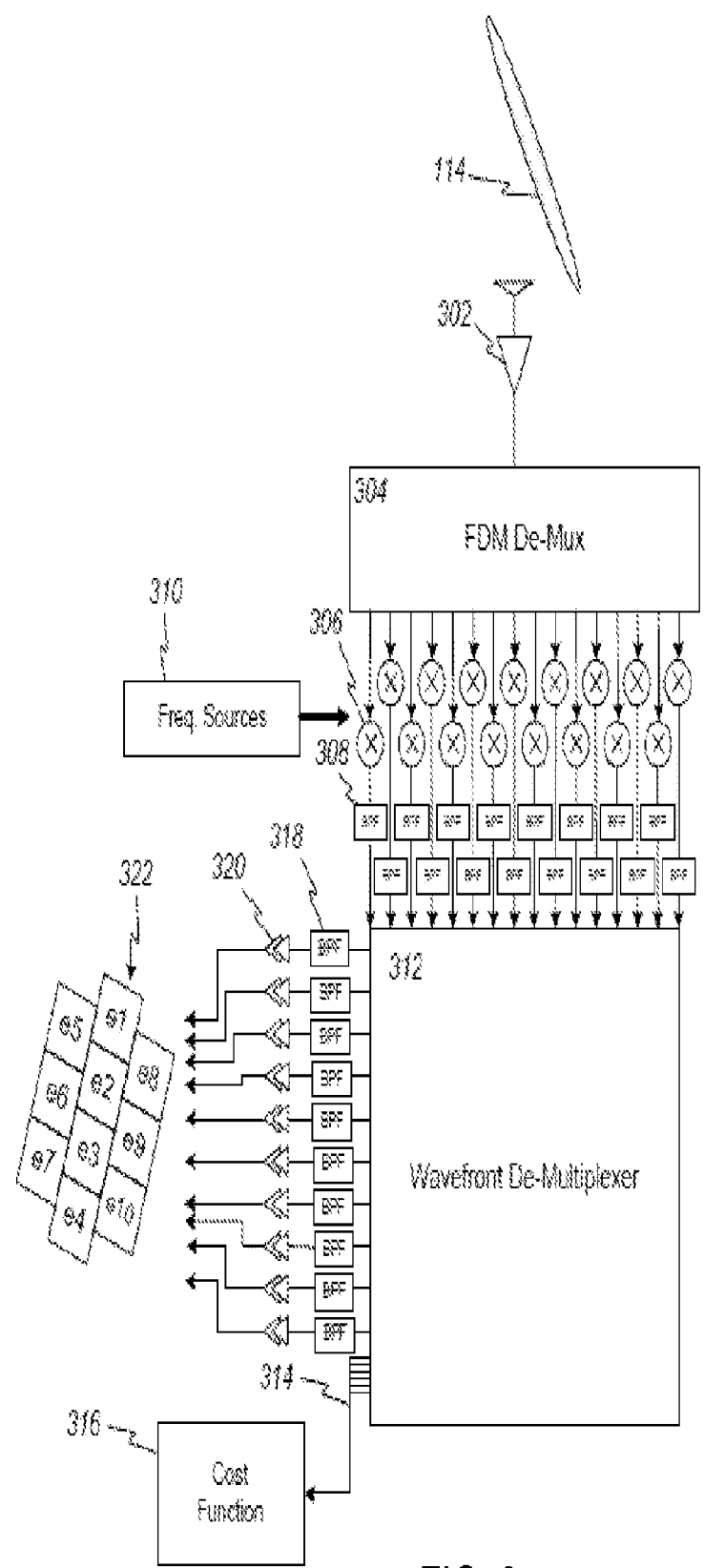
FIG. 3 is a block diagram of an embodiment of the satellite segment of a satellite broadcast system in accordance with the present invention.

FIG. 3 depicts a more detailed view of an embodiment of the satellite segment of a direct broadcast system in accordance with the present invention. The uplink receive antenna 114 receives the C-band FDM uplink signal from the ground segment depicted in FIG. 2. Note that frequencies other than C-band may be used for the uplink feeder links and still fall within the scope and spirit of the present invention. On the broadcasting satellite, the two FDM uplinked signals are amplified by low-noise amplifiers 302 and sent to two FDM de-multiplexers 304 that split the 6 GHz FDM signals into constituent carriers, spaced 62.5 MHz apart. Of course, different frequency spacings of the constituent pieces of the uplink carrier may be used within the scope of the present invention.

The sixteen individual components of the uplink carrier are then passed through sixteen frequency converters 306 that frequency-shift the uplink elements to the broadcast downlink frequency, here assumed to be S-band. However, other satellite broadcast downlink frequencies such as Ku-band or Ka-band may also be used.

The outputs of the frequency converters 306 are the sixteen channel signals, all at S-band in this embodiment. The sixteen channels are passed through band-pass filters 308 and then enter a wavefront de-multiplexer 312 that performs a spatial Fourier transform (FT) of the sixteen uplinked channels. The transformation performed in the wavefront de-multiplexer 312 is essentially the opposite of that performed in the wavefront multiplexer 216 in the ground segment. Thus, ten element signals are recovered, are filtered by band-pass filters 318, are amplified by solid-state power amplifiers 320 or other radio-frequency amplifiers, and are routed to corresponding radiating elements of the downlink broadcast antenna array 322. The amplitude and phase profiles imparted to the signals by the ground-based DBF processors then cause the fields radiated by the downlink broadcast antenna array 322 to combine constructively and destructively coverage areas. The satellite segment itself is relatively uncomplicated and simply passes through the beam-forming encoding generated by the ground segment. This keeps most of the complexity and control on the ground, where it is easily accessible for upgrades, maintenance, and reconfiguration as required.

As the sixteen uplink element signals pass through the wavefront de-multiplexer 312, the six null channels 314 are also recovered along with the ten signal channels. If all of the processing and propagation channels for the sixteen radiated signal elements were identical, the null channels would output nothing. However, imbalances in attenuation levels, phase delays and other propagation effects of the various uplink back channels will tend to cause energy to leak into the null channels 314. Thus, they become observables that can be used to measure and correct for imbalances in the uplink back channels. The null channels 314 are routed to a cost function processor 316 that calculates compensation weight vectors (CWVs) to compensate for propagation effects. These correction vectors may be applied on board the satellite segment to correct the received uplink signals, or alternatively, could be downlinked back to the ground segment via a separate backchannel to allow the ground segment to pre-compensate the uplink elements before transmission to the satellite.

As noted previously, a system in accordance with the present invention need not employ ten signal channels, sixteen uplink element signals, and six null channels. In more general terms, a system may comprise N signal channels and M uplink element signals, where M and N are positive integers greater than one. If the continuous calibration method is to be used, M must be greater than N, and the number of null channels is equal to M–N. However, systems for which M is equal to N and no continuous calibration is performed would also fall within the scope and spirit of the present invention.

Figure 4:
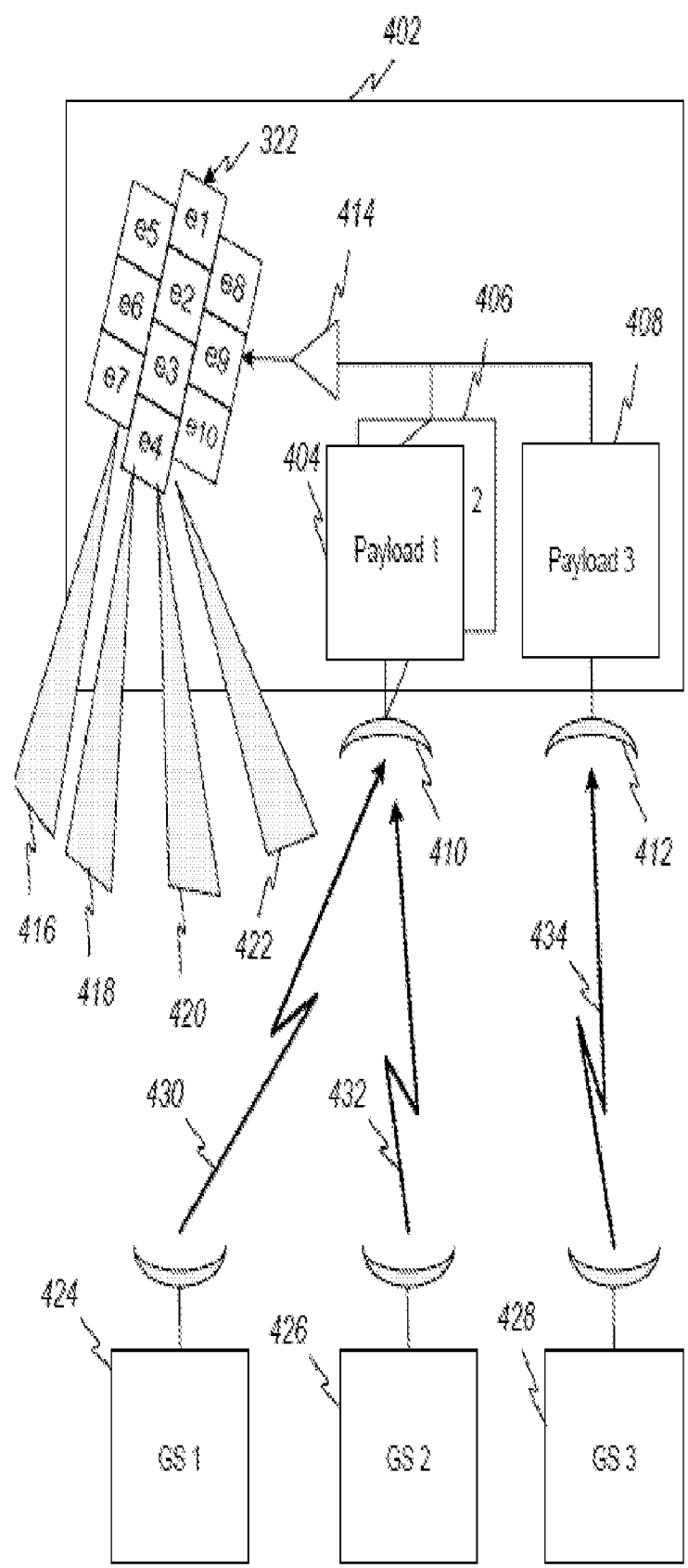
FIG. 4 depicts an example of a satellite broadcast system in which multiple distributed ground stations communicate with a satellite segment to produce multiple simultaneous downlinks in accordance with the present invention.

FIG. 3 depicts a single uplink-downlink processor on board the satellite driving the downlink broadcast antenna array 322. However, multiple uplink-downlink processors may be used simultaneously with the same downlink broadcast antenna array 322. FIG. 4 illustrates an embodiment of such a system including multiple satellite payloads all driving the same downlink broadcast antenna array 322. The embodiment depicted in FIG. 4 includes a satellite segment 402 that comprises a downlink broadcast antenna array 322 driven by a set of power amplifiers 414 that are themselves driven by signals from a first 404, second 406, and third 408 payload element. Each of the payload elements 404, 406, and 408, includes the components depicted in the system of FIG. 3.

As depicted in FIG. 4, the satellite segment 402 interacts with a ground segment that includes three ground stations 424, 426, and 428. Each of the ground stations generates an uplink signal 430, 432, and 434, that is distinct in broadcasting frequency from the uplink signals generated by the other two ground stations. In the embodiment depicted here, two of the uplinks are directed toward an uplink receive antenna 410 that is shared by the first payload element 404 and the second payload element 406. The uplink frequency difference between uplinks 430 and 432 allow the satellite segment to distinguish between the two. The first uplink 404 is processed by the first payload element 404 to generate ten drive signals that are sent to the downlink broadcast antenna array 322. Similarly, the second uplink 432 is processed by the second payload 406 to generate an additional ten drive signals that are also applied to the downlink broadcast antenna array 322. Finally, the third uplink 434, is received by a second satellite-segment uplink-receive antenna 412, which might be pointing to a different coverage area than the other uplink-receive antenna 410. The third uplink 434 is processed by the third payload element 408 and an additional ten drive signals are produced that are amplified by the amplification stage 414 and routed to the same downlink broadcasting antenna array 322. The three beams can be controlled independently and may broadcast different content data either by maintaining spatial separation of coverage areas while using the same frequency spectral band, overlapped coverage areas with frequency-separated broadcasting channels, or a combination of both. When overlapping coverage areas are used, other techniques, such as orthogonal coding, e.g. CDM, or time domain multiplexing (TDM) can be used.

The digital beam formers in each of the ground stations 424, 426, and 428 encode their respective uplinks with proper phase and amplitude profiles such that when converted to downlink frequency and radiated by the downlink broadcast array 322, the signals from downlink elements will add nearly coherently only in the selected coverage area for each of the beams created by the ground stations 424, 426, and 428. Thus, the downlink broadcast antenna array is able to radiate multiple, simultaneous beams 416, 418, 420, and 422 pointing to independent coverage areas, including different broadcast data, and optionally including broadcasting beams with slowly configurable coverage areas to accommodate satellites in slightly inclined geostationary orbits. Thus, the complexity associated with pointing multiple simultaneous beams, establishing appropriate footprints, and managing which content is downlinked to which geographic regions is largely controlled by the ground segment. This simplifies the satellite segment and greatly improves the configurability of the direct broadcast system.

Thus, a direct broadcast system is achieved in which remote beam forming processors located among distributed ground stations may be used to control downlink beam footprints and pointing directions. Digital beam forming techniques allow a single satellite downlink broadcast antenna array to generate multiple simultaneous downlink beams that can be shaped and pointed independently and that may carry distinct information content. By allocating some of the uplink channel elements as null channels, continuous calibration of the uplink channel can be performed, improving the performance and quality of the downlink broadcasting efficiency for user segments. Those skilled in the art will likely recognize further advantages of the present invention, and it should be appreciated that various modifications, adaptations, and alternative embodiments thereof may be made within the scope and spirit of the present invention. The invention is further defined by the following claims.

Figure 5:
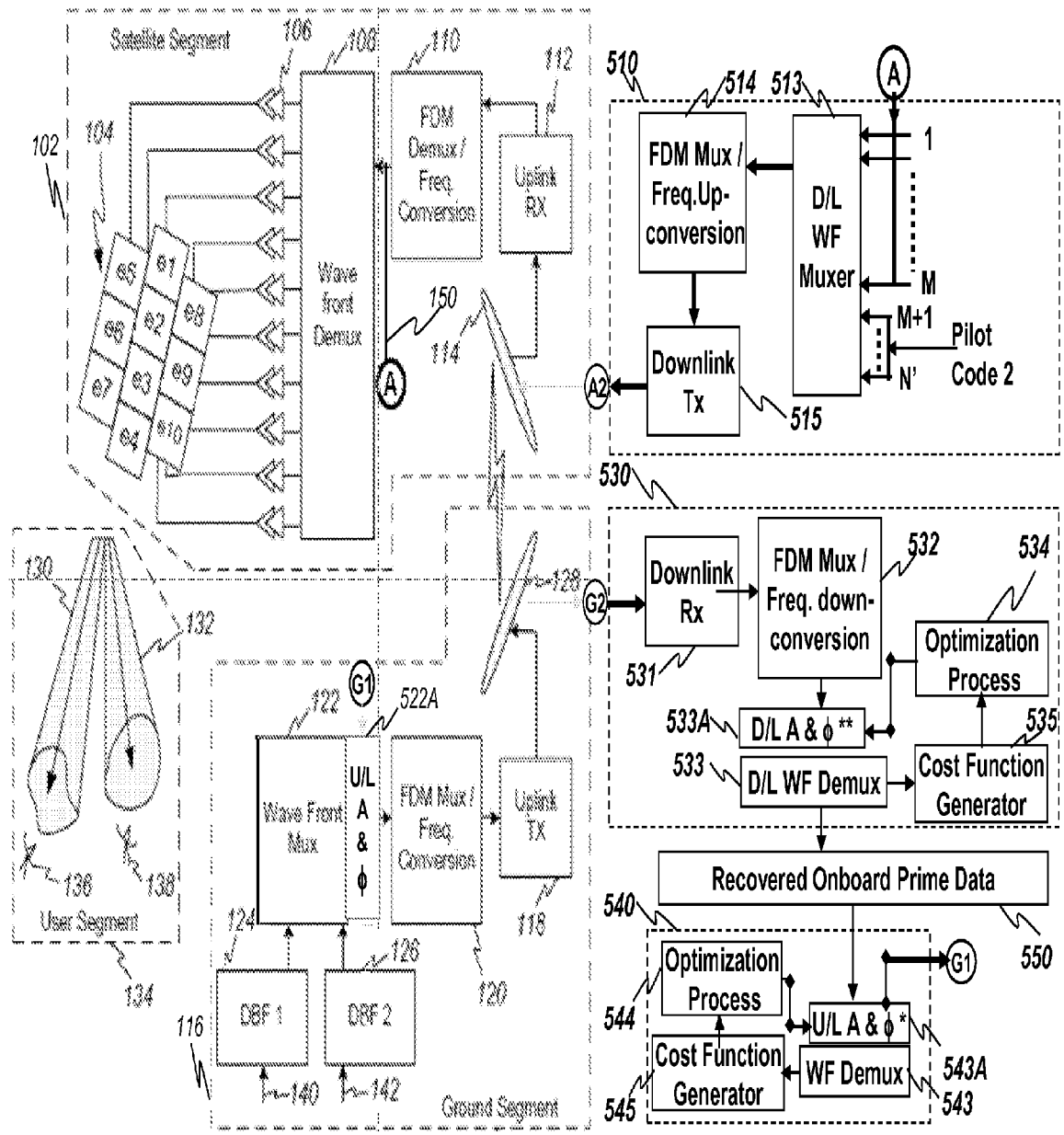
FIG. 5 depicts an example of back channel up-link calibrations for the feeder link implemented via pre-compensations on ground for a satellite broadcast system in accordance with the present invention.

FIG. 5 depicts a block diagram of a direct broadcast system with 4 functional expansions of FIG. 1 in accordance with the present invention. The 4 functional expansions are implemented in both ground and satellite segments (1) A programmable equalizer 522A is inserted in the ground segment between the functional box of WF mux 122 and that of FDM Mux/Freq. Conversion 120;
   a. It is serviced as a pre-compensating processor altering amplitudes and phases of signals passing through
   b. via a weighting process by a compensation weighting vector (CWV)

(2) a receiving function interface, G2, is implemented in the ground segment as a part of the back-channel downlink functions of the feeder-link via the ground antenna 128;

(3) channelized received data at the point 'A' in between the functional block of the FDM Demux/Freq. Conversion 110 and that of WF demux 108 the on satellite is referred to as the onboard prime data, which will be transported to downlink (D/L) back channels of the feeder-link, and (4) a transmitting function interface, A2, is implemented in the satellite segment as a part of the D/L back channels of the feeder-link via the satellite antenna 114.

There are two pairs of WF mux/demux processing; one inside the other. The outer one is for calibration of back-channel for U/L data transfer consisting of the WF mux 122 on ground and WF demux 108 on satellite. Programmable equalizer 522A is placed on ground as a pre-distortion mechanism compensating for anticipated up-link propagation differentials. The inner pair features a downlink (D/L) WF mux 513 on satellite and a D/L WF demux 533 on ground with a programmable equalizer 533A as a post-compensation mechanism for the D/L back channel propagation differentials. There is an additional WF demux processing 543 and associated programmable equalizer 543A on ground emulating compensating effects of the equalizer 522A in the main path for the back channels in uplink. They are part of an optimization loop 540 for the uplink equalization. The resulting CWV for the equalizer 543A will be copied to the pre-distortion equalizer 522A on a frame to frame basis.

Ground segment 116 includes a first digital beam forming (DBF) processor 124 and a second DBF processor 126. Content data 140 enters the first DBF processor 124, and content data 142 enters the second DBF processor 126. The two content streams may be identical or may be distinct, depending on the particular broadcast application. The first DBF processor applies a set of beam weight vectors (BVWs) to the content data 140 that correspond to a particular selected footprint for a first beam 130 that will be downlinked from the satellite segment 102. The second DBF processor 126 similarly applies an independent set of BWVs to the content data 142 that correspond to a separate distinct footprint for a second beam 132 that will be downlinked by the satellite segment 102. The content data, now encoded with beam footprint and pointing information, is sent to a wavefront multiplexer 122. The wavefront multiplexer 122, performs a spatial Fourier transform (FT) of the encoded content data to produce multiple baseband uplink signals. The outputs of the spatial FT are modified by compensation weighting vectors (CWV) 522A as a pre-distortion means to equalize propagation differentials to be encountered when propagating through feeder links between a ground antenna 128 and a satellite antenna 114. CWV weighting 522A is usually implemented digitally by a bank of digital complex multipliers and are controlled by an optimization processor 540. The bank of multipliers is usually a part of a digital processor performing the DBFs and WF muxing functions.

The multiple baseband signals are then frequency up-converted 120 to several closely-spaced uplink carriers and combined into a composite frequency-domain multiplexed (FDM) uplink signal. To save bandwidth, two FDM multiplexers may be used to create two half-bandwidth streams, each with an orthogonal polarization such as vertical and horizontal linear polarization, or right-hand circular polarization (RHCP) and left-hand circular polarization (LHCP). The uplink signal is then amplified 118 and uplinked to one or more satellites via the antenna 128. It should be noted that while the above description refers to a ground segment including two DBF processors for encoding two content data streams, other numbers of DBF processors are possible and would fall within the scope and spirit of the present invention. Generally speaking a DBF processor may generate many concurrent beams. We shall refer a Tx DBF processor as a P-to-N Tx DBF processor which features P inputs and N outputs. The P input corresponds to P input-beams, and N outputs for the N antenna elements.

The satellite segment 102 receives the uplinked FDM signal via an uplink receive antenna 114 for a feeder-link. The uplink signal is amplified 112 and sent through an FDM receiver 110 that de-multiplexes the closely spaced carriers and frequency converts them to the satellite segment downlink frequency. The de-multiplexed and frequency-converted signals, identified by "A" as "pre-WF demuxer signals," are divided into two paths. The pre-WF demuxer signals featuring M individual streams via the first path 150 are sent to an onboard N'-to-N' WF muxer 513, where N'>M and N' inputs also consisting of N'−M pilots inputs initiated on satellite. The WF muxer 513 is a part of the on-board down-link unit 510 for the feeder-link. The N' outputs of the WF muxer 513 are frequency-converted and FDM muxed by an FDM muxer 514, amplified by a downlink transmitter 515, and then radiated by the feeder-link antenna 114.

The on board prime data in the second path from the FDM receiver 110 are passed through a wavefront de-multiplexer 108, that performs a spatial FT of the received signals. The outputs of the wavefront de-multiplexer 108 are amplified 106 and routed to elements of an downlink broadcast antenna array 104. The BWVs that were encoded into the two beams by the ground segment facility 116 operate to generate two independent downlink beams 130 and 132 in the user segment 134. The footprints of the two downlink beams 130 and 132 can be controlled by the ground segment 116 to illuminate geographically separated users 136 and 138. The ground segment 116 can also control which digital content is sent to user groups 136 and 138 by varying the inputs 140 and 142 to the two DBF processors 124 and 126.

The downlink back-channels of the feeder-link on ground features captured signals by the ground antenna 128, and sent to a downlink (D/L) processor 530, in which the received signals are amplified by a D/L receiver 531, demuxed and frequency converted by a FDM demuxer 532 into N' signal streams, which are subsequently frequency converted to a common carrier, and then connected to a programmable equalizer 533A for compensating the path differential by a D/L CWV (down link compensation weight vector). There is an optimization loop, converting outputs associated with satellite initiated pilot signals from the D/L WF Demuxer 533 to a cost function generator 535 to map the current performance status into positively defined performance indexes, or cost functions. As part of an optimization processor 534, the cost functions are used to dynamically form "Total Cost" for D/L, and measurement of cost gradients. The optimization processor 534, based on a cost minimization algorithm, calculates updated D/L CWV continuously. At steady state, total D/L cost shall become zero or negligibly small. As result, the updated D/L CWVs shall remain the same, and the M-streams of onboard pre-WF demuxer signals 550 are recovered on ground.

Based on the recovered onboard prime data 550, there is another optimization loop to calculate current coefficients of the pre-distortion equalizer. The optimization loop on ground features:
1. a WF demuxer 543 to emulate performance of on board WF demuxer 108, converting outputs associated with ground initiated diagnostic signals from the WF muxer 122
2. a cost function generator 545 mapping the recovered diagnostic signals from the WF muxer 122 into cost functions as a set of performance indexes,
3. an optimization processor 544 formulates a total cost, performs measurements of the cost gradients, calculated new U/L CWV, and then send the new CWV for updating in the programmable equalizer 543A. At steady state, total U/L cost shall become zero or negligibly small. As result, the updated U/L CWVs shall remain the same.
4. the optimization loop 540 also send the current new CWV to the equalizer 522A in the main uplink paths on a frame-by-frame basis.

It should be noted that while the embodiment described above employed two DBF processors to encode two uplink content streams, more than two DBF processors and content streams may also be used to create more than two downlink beams. Such systems employing multiple DBF processors would also fall within the scope and spirit of the present invention. Such systems employing multiple DBF processors would also fall within the scope and spirit of the present invention. Similarly, one DBF processor and multiple content streams may also be used to create multiple broadcasting downlink beams; each associated with different content streams and covering various service areas. Such systems employing a single DBF processor with multiple coverage areas for various content streams would also fall within the scope and spirit of the present invention.

Figure 5A:
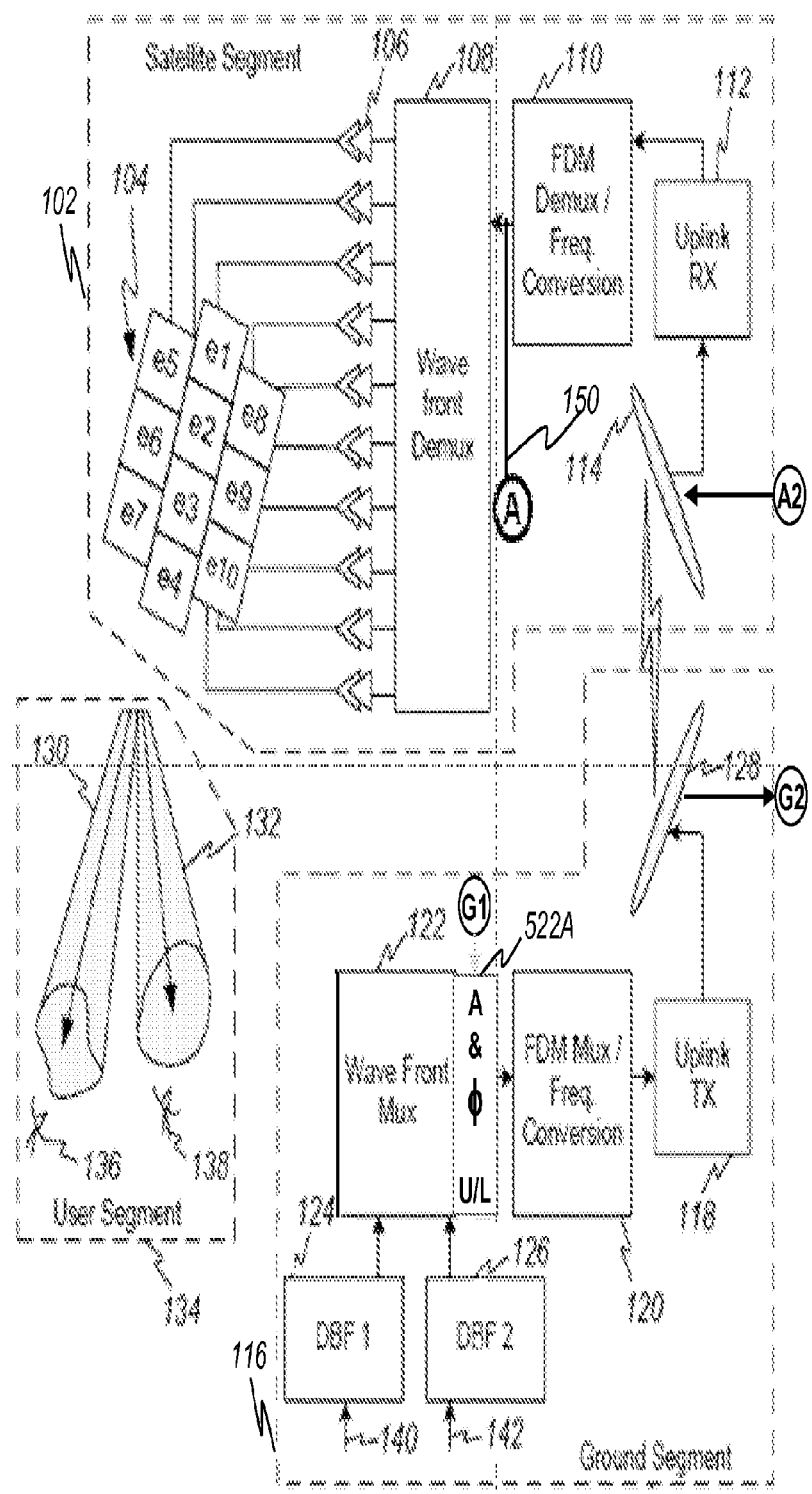
FIG. 5A depicts a portion of a back-channel down-link interface of the feeder-link of FIG. 5 in which an example of the back channel up-link calibrations for the feeder-link are implemented via pre-compensations on ground of a satellite broadcast system in which in accordance with the present invention.

FIG. 5A depicts a block diagram of a direct broadcast system with 4 functional expansions of FIG. 1 in accordance with the present invention. The 4 functional expansions are implemented in both ground and satellite segments
(1) a programmable equalizer 522A inserted in the ground segment between the functional box of WF mux 122 and that of FDM Mux/Freq. Conversion 120;
(2) a receiving function interface, G2, implemented in the ground segment as a part of the downlink (D/L) back channels of the feeder-link via the ground antenna 128;
(3) channelized received data on the first satellite at the point 'A' in between the functional block of the FDM Demux/Freq. Conversion 110 and that of WF demux 108, referred to as the on board primedata,
(4) a transmitting function interface, A2, is implemented in the satellite segment as a part of the D/L back channels of the feeder-link via the satellite antenna 114.

Depicted is only one of the two sets of WF mux/demux processing. The outer one consists of the WF mux 122 on ground and WF demux 108 on the first satellite featuring the programmable equalizer 522A pre-compensating anticipated up-link propagation differentials. The inner one (not shown) features a D/L WF mux on satellite interfacing with "A2" and a D/LWF demux on ground interfacing with "G2." There is an additional WF demux on ground interfacing with "G1."

The ground segment 116 includes a first digital beam forming (DBF) processor 124 and a second DBF processor 126. Content data 140 enters the first DBF processor 124, and content data 142 enters the second DBF processor 126. The two content streams may be identical or may be distinct, depending on the particular broadcast application. The first DBF processor applies a set of beam weight vectors (BVWs) to the content data 140 that correspond to a particular selected footprint for a first beam 130 that will be downlinked from the satellite segment 102. The second DBF processor 126 similarly applies an independent set of BWVs to the content data 142 that correspond to a separate distinct footprint for a second beam 132 that will be downlinked by the satellite segment 102. The content data, now encoded with beam footprint and pointing information, is sent to a wavefront multiplexer 122. The wavefront multiplexer 122 performs a spatial Fourier transform (FT) of the encoded content data to produce multiple baseband uplink signals. The outputs of the spatial FT are modified by a U/L programmable equalizer 522A via its compensation weighting vector (CWV). The programmable equalizer 522A serves as a dynamic pre-distortion means to equalize propagation differentials to be encountered when propagating through uplink back channels of the feeder links between a ground antenna 128 and a satellite antenna 114. The programmable equalizer 522A featuring CWV weighting is usually implemented digitally by a bank of digital complex multipliers and is controlled by an optimization processor 540. The bank of multipliers is usually a part of a digital processor performing the DBFs and WF muxing functions.

The multiple baseband signals are then frequency up-converted 120 to several closely-spaced uplink carriers and combined into a composite frequency-domain multiplexed (FDM) uplink signal. To save bandwidth, two FDM multiplexers may be used to create two half-bandwidth streams, each with an orthogonal polarization such as vertical and horizontal linear polarization, or right-hand circular polarization (RHCP) and left-hand circular polarization (LHCP). The uplink signal is then amplified 118 and uplinked to one or more satellites via the antenna 128. It should be noted that while the above description refers to a ground segment including two DBF processors for encoding two content data streams, other numbers of DBF processors are possible and would fall within the scope and spirit of the present invention.

The satellite segment 102 receives the uplinked FDM signal via an uplink receive antenna 114 for a feeder-link. The uplink signal is amplified 112 and sent through a FDM receiver 110 that de-multiplexes the closely spaced carriers and frequency converts them to the satellite segment downlink frequency. The de-multiplexed and frequency-converted signals, identified by "A" as "pre-WF demuxer signals," are divided into two paths. The signals in the first path 150 are sent to an onboard N'-to-N' WF muxer. In the second path, the de-multiplexed and frequency-converted signals are then passed through a wavefront de-multiplexer 108, which performs a spatial FT of the received signals. The outputs of the wavefront de-multiplexer 108 are amplified 106 and routed to elements of a broadcast antenna array 104. The BWVs that were encoded into the two beams by the ground segment facility 116 operate to generate two independent downlink beams 130 and 132 in the user segment 134. The footprints of the two downlink beams 130 and 132 can be controlled by the ground segment 116 to illuminate geographically separated users 136 and 138. The ground segment 116 can also control which digital content is sent to user groups 136 and 138 by varying the inputs 140 and 142 to the two DBF processors 124 and 126.

It should be noted that while the embodiment described above employed two DBF processors to encode two uplink content streams, more than two DBF processors and content streams may also be used to create more than two downlink beams. Such systems employing multiple DBF processors would also fall within the scope and spirit of the present invention.

Figure 5B:
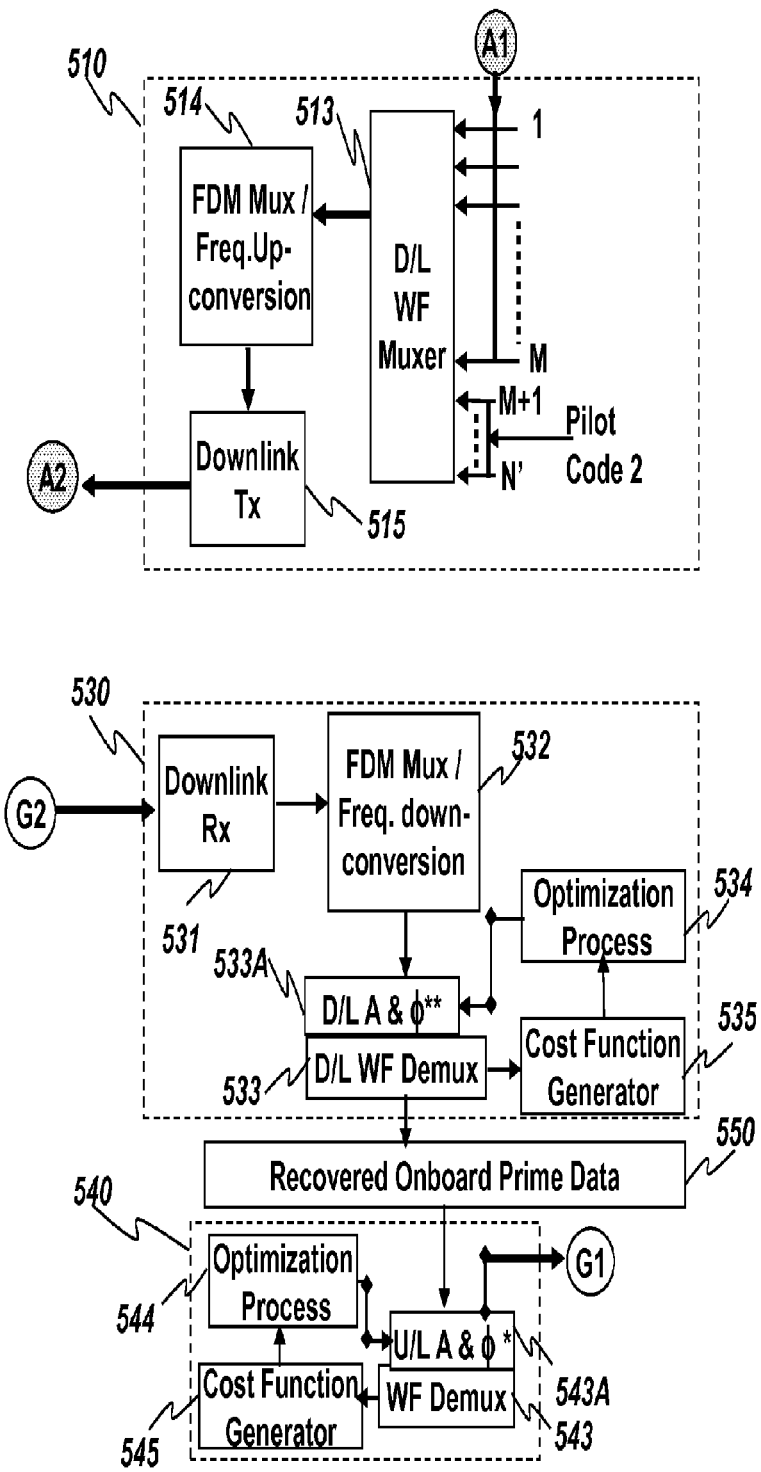
FIG. 5B depicts three calibration functions boxes of FIG. 5 in which an example of feeder link calibrations for the back channel up-link are implemented via pre-compensations on ground of a satellite broadcast system in accordance with the present invention; (a) a satellite borne transmission functions via a separated WF muxing for the down link interface of the feeder-link, (b) a ground based receiving WF demuxing functions compensating for down link propagation differentials of the feeder-link, and (c) a ground based pre-compensation functions for up link propagation differentials of the feeder-link.

FIG. 5B depicts 3 processing blocks 510, 530 and 540; the block 510 is on board a satellite, the blocks 530 and 540 are on ground. A set of WF mux/demux operation features a D/L WF muxing 513 on board satellite in the block 510, and the associated D/L WF demuxing 533 on ground in the block 530.

For the on-board down-link unit 510, the inputs of de-multiplexed and frequency-converted signals, identified by "A" as the onboard prime data, featuring M individual streams are sent to an onboard N'-to-N' D/L WF muxer 513; where N'>M and N' inputs also consisting of N'–M pilots inputs initiated on satellite. The N' outputs of the D/L WF muxer 513 are frequency-converted and FDM muxed by an FDM muxer 514, amplified by a downlink transmitter 515, and then radiated by the feeder-link antenna 114.

The captured signals by the ground antenna 128 are sent to a downlink (D/L) processor 530, in which the received signals are amplified by a D/L receiver 531, demuxed and frequency converted by a FDM demuxer 532 into N' signal streams which are frequency converted to a common carrier, and then connected to a programmable equalizer 533A as a path differential compensating processor, and the D/L WF Demuxer 533. The programmable mechanism for the equalizer 533A is implemented via a dynamic downlink compensating weighting vector (D/L CWV). There is an optimization loop, converting outputs associated with satellite initiated pilot signals from the D/LWF Demuxer 533 to cost functions as performance indexes by a cost function generator 535, which are used to dynamically form a Total D/L Cost as a good current performance indicator of the optimization loop. Cost functions must be positive defined (≥0). An optimization processor 534 based on a cost minimization algorithm calculates updated D/L CWV for the equalizer 533A continuously. At steady state, total D/L cost shall become zero or negligibly small. As result, the updated D/L CWVs shall remain the same, and the M-streams of onboard pre-WF demuxer signals 550 are recovered on ground.

A main optimization loop 540 features M-stream inputs from the recovered onboard prime data 550, a WF demuxer 543 to emulate performance of on board WF demuxer 108, and a cost function generator 545 converting outputs of the WF demuxer 543 associated with ground initiated pilot signals from the WF muxer 122 to cost functions as performance indexes. Cost functions are used to dynamically form an uplink (U/L) total cost, and must be positive defined (≥0). An optimization processor 544 based on a cost minimization algorithm continuously calculates updated CWV U/L for the programmable equalizer 543A. At steady state, the U/L total cost shall become zero or negligibly small. As result, the updated U/L CWVs shall remain the same, and are periodically sent to the pre-distortion equalizer 522A in the main path for updating its U/L CWV.

Figure 5C:
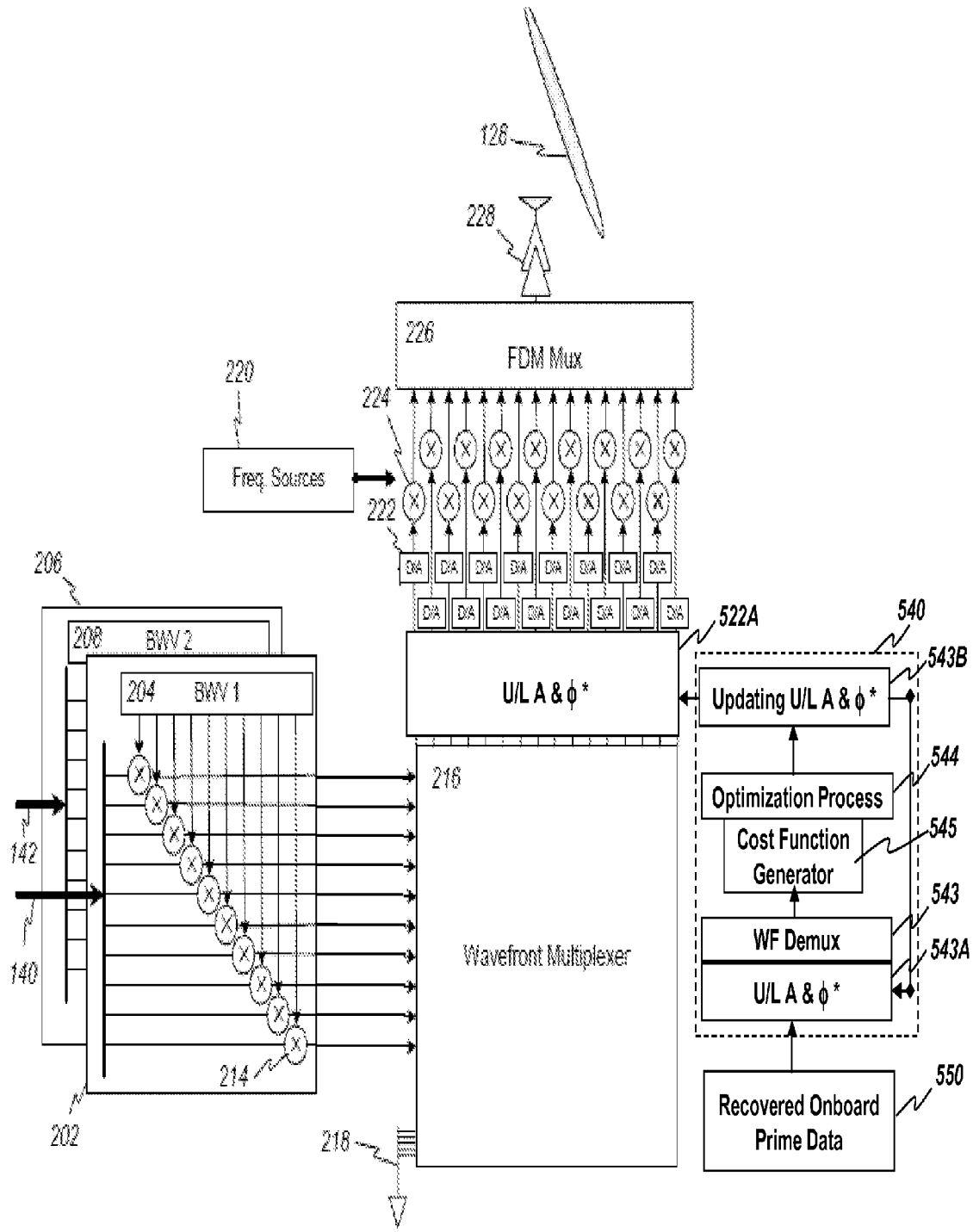
FIG. 5C depicts the calibration functions of FIG. 5 in which an example of feeder link calibrations for the back channel up-link are implemented via pre-compensations on ground of a satellite broadcast system in accordance with the present invention; assuming (1) the onboard WF demuxed signals are available on the ground processing facility, (2) the propagation differentials after the WF demuxer in FIG. 5 are properly compensated by modifications on the BWVs of the DBFs.

FIG. 5C presents a more detailed block diagram of an embodiment of a ground segment portion of a digital broadcast system in accordance with the present invention. The two content data streams 140 and 142 are depicted as inputs to a first DBF processor 202 and a second DBF processor 206. The digital content stream 140 is split into ten portions that are multiplied by components of a ten-dimensional first BWV 204. Each of the ten components of the first BWV 204 is a complex number containing both an amplitude piece and a phase piece. The specific values of the BWV are chosen to create a particular beam footprint from the downlink array antenna 104 of the satellite segment, as fully described with reference to FIG. 5. The content data stream 140 is multiplied in the array of complex multipliers 214 by the first BWV 204, and the encoded contents are then routed to a wavefront multiplexer 216.

At the same time, the second input content stream 142 is multiplied by a second set of BWVs 208 in the second DBF processor 206 to create an independent second beam in the satellite segment. Note that altering the values of the second BWV 208 will change the footprint and pointing direction of the second beam generated by the satellite segment independent from those of the first beam. After multiplication by the second BWV 208, the outputs of the second DBF 206 are combined with those from the first DBF 202 on an element-by-element basis, and the combined element signals are routed to the inputs of the wavefront multiplexer 216.

The BWV 1 204 and BWV 2 208 may also be used to include static and time varying equalizations for amplitude and phase differentials due to unbalanced paths and electronics on board satellites between the outputs of the WF demuxer 108 and the radiating array elements 104.

The wavefront multiplexer 216 takes the input elements, encoded with amplitude and phase pointing data, and performs a spatial Fourier transform (FT). The wavefront multiplexer 216 can be implemented in many ways, such as by a sixteen-by-sixteen muxers using Butler Matrices as building blocks, well known in the art. Note that for the embodiment depicted in FIG. 5C, only ten of the inputs of the wavefront multiplexer 216 are used while all outputs are used. The remaining six inputs are set to null (zero) inputs, as shown schematically at 218. The zero-input channels, served as probing signals, will allow for continuous calibration, equalization, and optimization of the dynamic propagation effects of the uplink back-channels in the feeder link, enabling improved system performance Wavefront multiplexers of sizes other than sixteen by sixteen may also be used, different numbers of unused inputs may also be employed, and continuous calibration may be performed as long as the number of wavefront multiplexer signal inputs is less than the number of outputs. Such alternately sized systems would also fall within the scope and spirit of the present invention.

By forming a Fourier transform, the wavefront multiplexer has the effect of mixing each of the ten inputs into each of the sixteen outputs which are connected to an equalizer 522A with a bank of digital weighting circuitries continuously performing pre-compensation weighting functions by modifying the 16 outputs by a compensation weighting vector (CWV U/L), which are controlled by a real time optimization loop 540. Thus, each of the ten input element signals is replicated and goes through all of the sixteen output channels, and each of the zero-input channels also goes through all of the sixteen output channels. In the subsequent ground processing, uplinking to the satellite element, and processing in the satellite, portions of the null-input signals thus sample each of the sixteen uplink channels and can be used to correct for dynamic channel-specific propagation effects and imbalances.

The outputs of the wavefront multiplexer 216 are run through digital-to-analog converters 216 that synthesize analog waveforms. The analog waveforms are then frequency up-converted 224 by a series of closely spaced carrier frequencies in the feeder-link uplink frequency band and generated by frequency sources 220. The uplink frequency may be any frequency spectrum useful for satellite communications, such as S-band, C-band, X-band, Ku-band, or Ka-band. For purposes of illustration, the uplink will be assumed to be C-band at 6 GHz. The sixteen output channels are then frequency up-converted by sixteen carriers separated by 62.5 MHz and extending from 5.75 GHz to 6.25 GHz. Other channel spacing can be used depending on the bandwidth requirements of the application. The separate carriers are then combined into two 500-MHz-wide C-band signals by low-loss frequency-domain multiplexers (FDMs) 226. The FDM carrier is then amplified 228 by a solid-state power amplifier, traveling wave-tube amplifier (TWTA), klystron, or other radio-frequency amplifier known in the art, and transmitted via an uplink transmit antenna 128. The two 500-MHz C-band signals are uplinked to the designated satellite using polarization diversity. For example, one signal may be horizontally polarized and the other vertically polarized. Or one may be right-hand circularly polarized (RHCP) and the other left-hand circularly polarized (LHCP).

Note that the ground segment described above may operate by itself or in conjunction with multiple ground segments having similar configurations. As long as their uplinks are separated via multiple frequencies/codes or multiple beams, multiple ground segments can be used to uplink content to the same satellite or group of satellites.

The optimization loop 540 utilizes the recovered onboard prime data 550 as real time inputs, performing diagnostics on amplitude and phase differentials mainly caused by the propagation paths in the up-link portion of the feeder-link via a duplicated WF demuxer 543 emulating the performance of the onboard demuxer 108. The optimization loop 540 converts some outputs of the WF demuxer 543 into cost functions as performance indexes, sums the all cost functions into a total cost, and then performs measurements of cost gradients, which are used to calculate the updated U/L CWV 543B continuously based on a cost minimization algorithm by an optimization processor 544. At steady state, U/L total cost shall become zero or negligibly small. As a result, the updated U/L CWVs 543A and 543B shall remain the same, and are periodically sent to the equalizer 522A in the main path for updating its U/L CWV.

Figure 6:
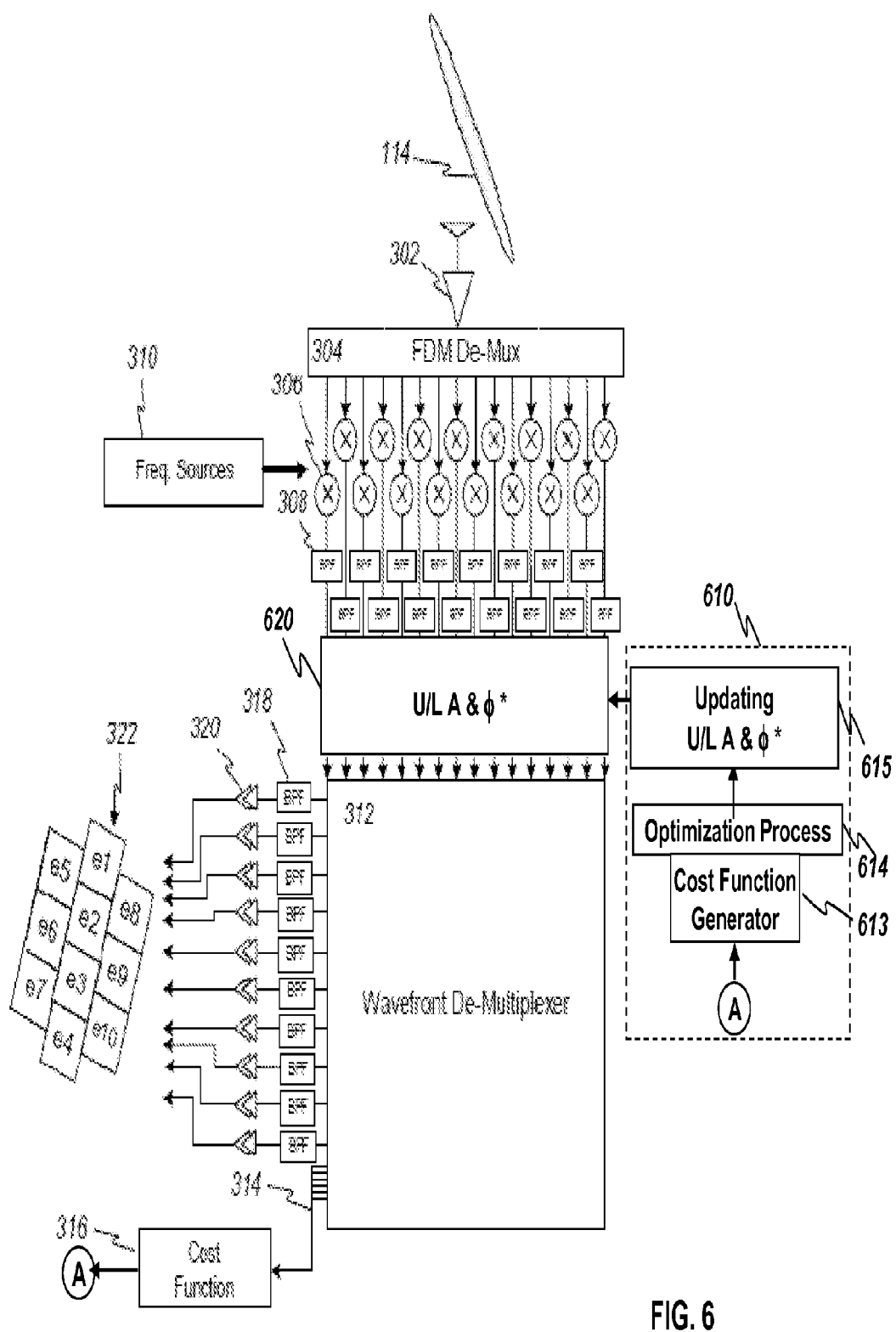
FIG. 6 depicts an example of feeder link calibrations for the back channel up-link implemented via satellite on-board compensations for a satellite broadcast system in accordance with the present invention.

FIG. 6 presents an implementation concept of onboard equalization on satellite. It depicts more detailed block diagram of an embodiment of a satellite segment portion of a digital broadcast system shown in FIG. 3 with onboard equalization in accordance with the present invention. The uplink receive antenna 114 receives the C-band FDM uplink signal from the ground segment depicted in FIG. 2. Note that frequencies other than C-band may be used for the uplink feeder links and still fall within the scope and spirit of the present invention. On the broadcasting satellite, the two FDM uplinked signals at two orthogonal polarizations are amplified by low-noise amplifiers 302 and sent to two FDM de-multiplexers 304 that split the 6 GHz FDM signals into constituent carriers, spaced 62.5 MHz apart. Of course, different frequency spacing of the constituent pieces of the uplink carrier may be used within the scope of the present invention.

The sixteen individual components of the uplink carrier are then passed through sixteen frequency converters 306 that frequency-shift the uplink elements to the broadcast downlink frequency, here assumed to be S-band. However, other satellite broadcast downlink frequencies such as Ku-band or Ka-band may also be used.

The outputs of the frequency converters 306 are the sixteen channel signals, all at S-band in this embodiment. The sixteen channels are passed through band-pass filters 308 and then modulated by a compensation weighting vector (CWV U/L) via a programmable equalizers 620. The equalized outputs then enter a wavefront de-multiplexer 312 that performs a spatial Fourier transform (FT) of the sixteen uplinked channels. The transformation performed in the wavefront de-multiplexer 312 is essentially the opposite of that performed in the wavefront multiplexer 216 in the ground segment. Thus, ten element signals are recovered, are filtered by band-pass filters 318, are amplified by solid-state power amplifiers 320 or other radio-frequency amplifiers, and are routed to corresponding radiating elements of the downlink broadcast antenna array 322. The amplitude and phase profiles imparted to the signals by the ground-based DBF processors then cause the fields radiated by the downlink broadcast antenna array 322 to designated coverage areas beam-by-beam. The satellite segment itself is relatively uncomplicated and simply passes through the beam-forming encoding generated by the ground segment. This keeps most of the complexity and control on the ground, where it is easily accessible for upgrades, maintenance, and reconfiguration as required.

As the sixteen uplink element signals pass through the wavefront de-multiplexer 312, the six null channels 314, or zero signal channels, are also recovered along with the ten signal channels. If all of the processing and propagation channels for the sixteen radiated signal elements were identical, the null channels would output nothing. However, imbalances in attenuation levels, phase delays and other propagation effects of the various uplink back channels will tend to cause energy to leak into the null channels 314. Thus, they become observables, which in-turn can be used to measure and correct for imbalances in the uplink back channels. The null channels 314 are routed to a cost-function processor 316 converting these observables into performance indexes or cost functions which must be positively defined. The cost function conversions 314 usually feature non-linear mapping procedures. An on-board optimization loop 610 will sum-up all current cost functions as a current total cost 613, performing measurements on the associated cost gradients with respect to the current CWV, and calculating a new CWV according to a cost minimization algorithm in an optimization processor 614, and finally updating CWV 615 accordingly in next cycle.

As previously noted, a system in accordance with the present invention need not employ ten signal channels, sixteen uplink element signals, and six null channels. In more general terms, a system may comprise N signal channels and M uplink element signals, where M and N are positive integers greater than one. If the continuous calibration method is to be used, M must be greater than N, and the number of null channels is equal to M−N. However, systems for which M is equal to N and no continuous calibration is performed would also fall within the scope and spirit of the present invention.

Figure 7:
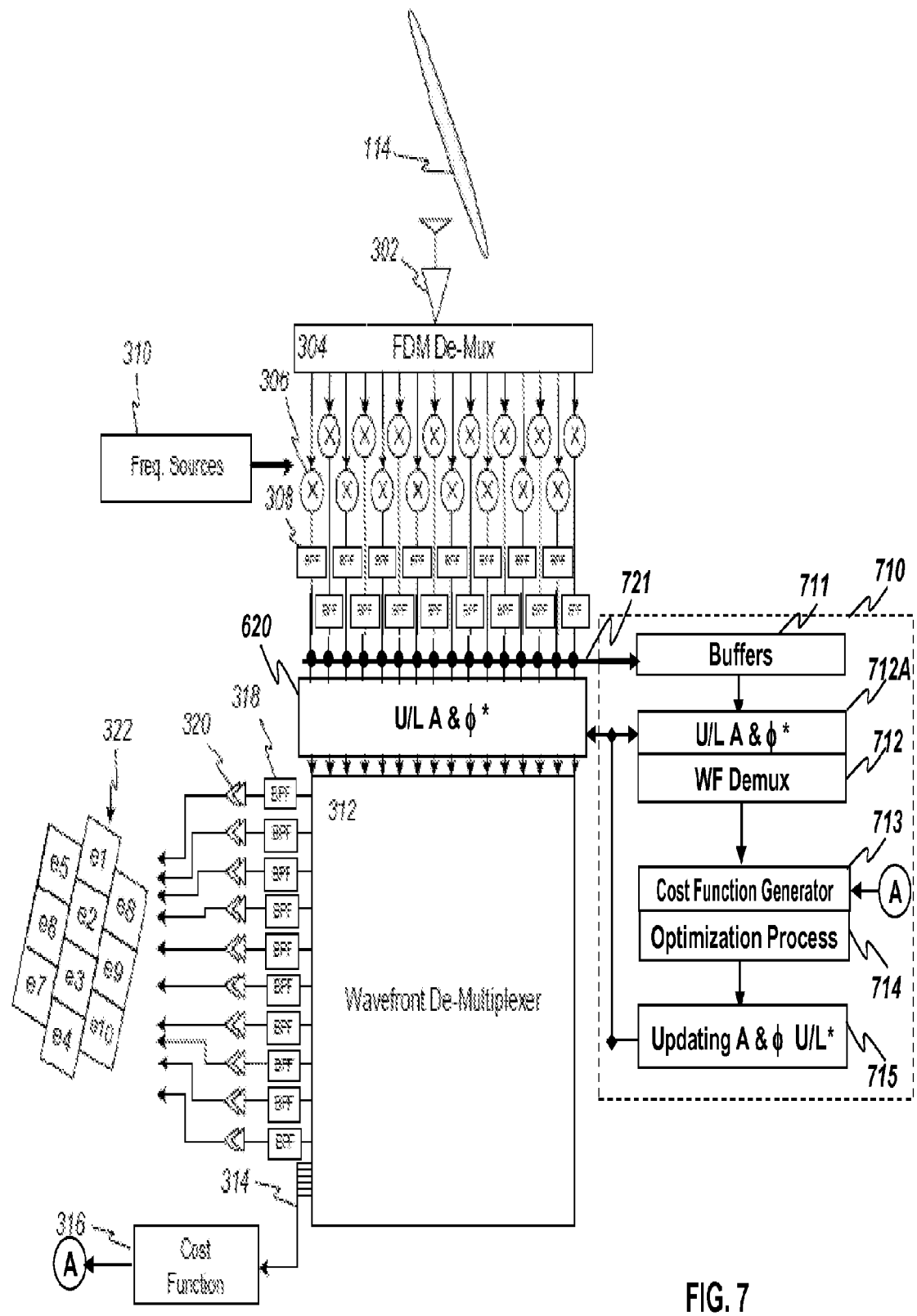
FIG. 7 depicts an example of feeder link calibrations for the back-channel up-link implemented via satellite on-board compensations for a satellite broadcast system in accordance with the present invention.

FIG. 7 presents a second implementation concept of onboard equalization by circuitries on satellite. It depicts more detailed block diagram of an embodiment of a satellite segment portion of a digital broadcast system shown in FIG. 3 with on-board equalization in accordance with the present invention. The uplink receive antenna 114 receives the C-band FDM uplink signal from the ground segment depicted in FIG. 2. Note that frequencies other than C-band may be used for the uplink feeder links and still fall within the scope and spirit of the present invention. On the broadcasting satellite, the two FDM uplinked signals are amplified by low-noise amplifiers 302 and sent to two FDM de-multiplexers 304 that split the 6 GHz FDM signals into constituent carriers, spaced 62.5 MHz apart. Of course, different frequency spacing of the constituent pieces of the uplink carrier may be used within the scope of the present invention.

The sixteen individual components of the uplink carrier are then passed through sixteen frequency converters 306 that frequency-shift the uplink elements to the broadcast downlink frequency, here assumed to be S-band. However, other satellite broadcast downlink frequencies such as Ku-band or Ka-band may also be used.

The outputs of the frequency converters 306 are the sixteen channel signals, all at S-band in this embodiment. The sixteen channels are passed through band-pass filters 308 and then divided into two paths, a main path, and a diagnostic path 721. The 16 channel signals in the main path are modulated by a dynamically corrected uplink compensation weighting vector (U/L CWV) via an equalizers 620. The equalized outputs then enter a wavefront de-multiplexer 312 that performs a spatial Fourier transform (FT) of the sixteen uplinked channels. The transformation performed in the wavefront de-multiplexer 312 is essentially the opposite of that performed in the wavefront multiplexer 216 in the ground segment. Thus, ten element signals are recovered, are filtered by band-pass filters 318, are amplified by solid-state power amplifiers 320 or other radio-frequency amplifiers, and are routed to corresponding radiating elements of the downlink broadcast antenna array 322. The amplitude and phase profiles imparted to the signals by the ground-based DBF processors then cause the fields radiated by the downlink broadcast antenna array 322 to designated coverage areas beam-by-beam. The satellite segment itself is relatively uncomplicated and simply passes through the beam-forming encoding generated by the ground segment. This keeps most of the complexity and control on the ground, where it is easily accessible for upgrades, maintenance, and reconfiguration as required.

The 16 channel band-passed signals in the second path 721 are sent to a diagnostic block 710. A set of the 16 channel signals are buffered in a bank of FIFO 711 for a processing frame which is defined as the time period for updating a new U/L CWV in the equalizer 620. A processing frame may consist of multiple cycles of optimization iterations, usually between 10 and 200 cycles. The diagnostic blocks feature an equalizer 712A in duplication of the equalizer 620 but with a dynamic U/L CWV altered iteration by iteration, and a U/L WF Demuxer 712 in duplication of the one 312 in the main path. In each optimization iteration cycle, the buffered data in the FIFO buffers 711 are modulated by a U/L CWV in the equalizer 712A, and then sent to the WF Demuxer U/L 712. The six null channels are also recovered along with the ten signal channels. If all of the processing and propagation channels for the sixteen radiated signal elements were identical, the null channels would output nothing. However, imbalances in attenuation levels, phase delays and other propagation effects of the various uplink back channels will tend to cause energy to leak into the null channels. Thus, they become observables, which can be used to measure and correct for imbalances in the uplink back channels. The null channels are routed to a cost function processor that converting these observables into performance indexes or cost functions which must be positively defined. The cost function conversions usually feature non-linear mapping procedures. An on-board optimization loop 710 will sum-up all current cost functions as a current total cost 713, perform measurements of the associated cost gradients with respect to the current CWV, and calculate a new U/L CWV for the equalizer 712B according to a cost minimization algorithm in the optimization process 714, and finally updating U/L CWV in the equalizer 712A accordingly. At the end of a processing frame, the new CWV U/L of the equalizer 712B will also be sent to update the CWV U/L of the equalizer 620 in the main path.

As noted previously, a system in accordance with the present invention need not employ ten signal channels, sixteen uplink element signals, and six null channels. In more general terms, a system may comprise N signal channels and M uplink element signals, where M and N are positive integers greater than one. If the continuous calibration method is to be used, M must be greater than N, and the number of null channels is equal to M−N. However, systems for which M is equal to N and no continuous calibration is performed would also fall within the scope and spirit of the present invention.

Figure 8:
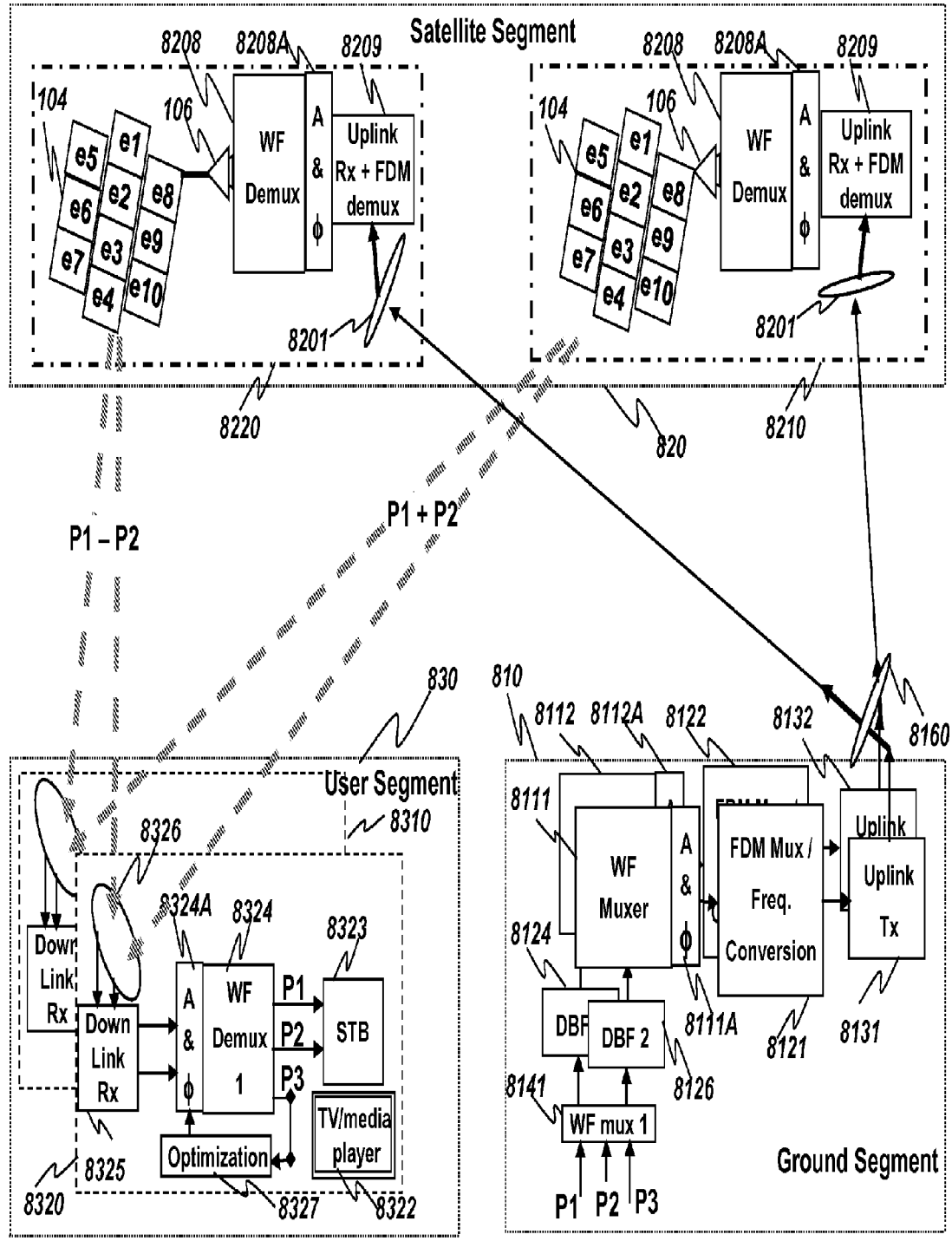
FIG. 8 depicts an example of coherent power combining of two broadcasting satellites via WF muxing in accordance with the present invention.

FIG. 8 presents a block diagram of an embodiment of a digital broadcast system using two separated satellites in accordance with the present invention. There are three segments; a ground segment 810, a satellite segment 820, and a user segment 830. In the ground segment 810, the two groups of content data streams P1 140 and P2 142, and a group of pilot signal streams P3 143 are depicted as inputs to a WF mux 1 814, which are connected to a first DBF processor 8124 and a second DBF processor 8126. The digital outputs from the first DBF processor 8124 are for a first satellite 8210 and those from the second DBF processor 8126 are for a second satellite 8220. The two satellites are located at different orbital slots where all users over a service area in the user segment can access to both satellites concurrently via multiple-beam-antennas (MBAs).

Depicted are two such users 8310 and 8320 in the user segment. A received (Rx) only terminal for a first user 8320 features a dish antennas 8326 with two Rx beams, a multi channel D/L receiver 8325, an equalizer 8324A and an associated WF demux 1 8324. The outputs comprise two groups of recovered signal streams P1 and P2, as well as a group of recovered pilot signals P3. The measured differences between the recovered pilot signals and those of desired pilot signals which are known a prior are mapped into performance indexes, which are used to measure and correct for imbalances among the propagation paths through the two broadcasting satellites. The performance indexes or the cost functions must be positively defined. The conversions from observables to cost functions usually feature non-linear mapping procedures. An optimization processor 8327 will sum-up all current cost functions as a current total cost 713, performing measurements of the associated cost gradients with respect to current weighting parameters in the equalizer 8324A, calculating a new weighting parameters including those for amplitude and phase (A & φ) modifications according to a cost minimization algorithm, and finally sending the new parameters for updating in the equalizer 8324A accordingly in next iteration cycle.

As a result of the WF multiplexing/demuxing with built-in path differential equalization process, recovered signal streams P1 141 at the outputs of the WF demux 1 8324 have passed through both broadcasting satellites 8210 and 8220, and they are the results of coherent combining of the radiations from both satellites. Similarly, the recovered signal streams P2 142 at the outputs of the WF demux 1 8324 have passed through both broadcasting satellites 8210 and 8220, and they are the results of coherent combining of the radiations from both satellites. Recovered signal streams P1 141 and P2 142 at the outputs of the WF demux 18324 share the power resources from both satellites.

The recovered signals P1 141 and P2 142 are sent to a set top box 8323 which is connected to a media center. The media center delivers desired signals to various display devices 8322.

At the ground segment, the two DBF processors 8124 and 8126 shall feature M1 outputs corresponding to M1 radiating elements 104 on both satellites 8210 and 8220. In our example M1=10. The numbers of inputs to the two DBF processors 8124 and 8126 shall be number of independent beams to be generated by the antenna arrays 104 on both satellites 8210 and 8220. Each beam radiated by a satellite antenna array is associated with a beam weight vector (BWV) consisting of M1 complex components indicating amplitude and phase weighting for individual elements of the array 104. The specific values of the BWV are chosen to create a particular beam footprint from the downlink transmission antenna arrays 104 of the satellite segment. For generating P1 beams from the array 104 in the first satellite 8210, there are P1 BWVs; each with M1 complex components. Similarly, for the second satellite 8220 with P2 beams from the array 104 with M1 elements, there shall be P2 BWVs and each BWV also features M1 complex components.

The outputs of DBF 1 8124, which are element signals for the array 104 of the first satellite 8210, become part of the inputs to a first 16-to-16 WF muxer 8111 The 16 channel outputs from the first WF muxer 8111 are then frequency converted and FDM muxed by FDM muxers 8121, filtered and amplified by uplink transmitter 8131, and radiated by a multiple beam antenna (MBA) 8160 to a first designated satellite 8210. Similarly, the outputs of DBF 2 8126 are part of the inputs to a second 16-to-16 WF muxer 8112. The 16 channel outputs from the second WF muxer 8112 are then frequency converted and FDM muxed by FDM muxers 8122, filtered and amplified by uplink transmitter 8132, and radiated by the MBA 8160 to a second designated satellite 8220.

In the satellite segment, the two satellites of the present embodiment are located at different orbital positions but servicing same coverage areas concurrently. For the first satellite 8210, the received 16 channel signals from the antenna 8201 of the feeder-link between the first satellite 8210 and a ground segment facility 810 are amplified and FDM de-multiplexed by an uplink receiver 8209. The demuxed 16 channels, converted to a common carrier frequency, are connected a dynamic equalizer 8208A for compensations of amplitude and phase differentials among 16 parallel paths incurred in the uplink between the uplink transmitter 8131 on the ground segment and the uplink receiver 8209 of the first satellite 8210. Ten of the 16 outputs of the WF demuxer 8208 are the recovered element signals which are power-amplified by a bank of power amplifiers 106, and then radiated by the array elements 104. The radiated signals are spatially combined in far-field over various designated coverage areas for different beams.

As to the outputs of the WF demuxer 8208, the remaining 6 ports are not depicted. They are for the recovery of pilot signal streams, which are used to derive performance index of current status of the dynamic equalizer 820A. Cost functions and associated total cost are generated for a quantified current status on the equalizer performance Cost gradients with respect to the current compensation weight vector (CWV) of an onboard equalizer 8208A are then measured. An optimization processor will update the CWV of the equalizer 8208A based on a cost minimization algorithm.

Similarly for the second satellite 8220, the received 16 channel signals from the antenna 8201 of the feeder-link between the second satellite 8220 and the ground segment facility 810 are amplified and FDM de-multiplexed by an uplink receiver 8209. The demuxed 16 channels, converted to a common carrier frequency, are connected a dynamic equalizer 8208A for compensations of amplitude and phase differentials among 16 parallel paths incurred in the uplink between the uplink transmitter 8132 on the ground segment and the uplink receiver 8209 of the second satellite 8220. Ten of the 16 outputs of the WF demuxer 8208 are the recovered element signals which are power-amplified by a bank of power amplifiers 106, and then radiated by the array elements 104. The radiated signals are spatially combined in far-field over various designated coverage areas for different beams.

What is claimed is:

1. A method for remotely generating first and second beams to be concurrently radiated by a downlink broadcast antenna array of a satellite, the method comprising:
    inputting first content data to a first digital beam forming processor;
    applying, via the first digital beam forming processor, a first set of beam weight vectors to the first content data, the first set of beam weight vectors including information on a first footprint and a first pointing direction of the first beam;
    generating first output data via the first digital beam forming processor;
    inputting second content data to a second digital beam forming processor;
    applying, via the second digital beam forming processor, a second set of beam weight vectors to the second content data, the second set of beam weight vectors including information on a second footprint and a second pointing direction of the second beam;
    generating second output data via the first digital beam forming processor;
    inputting the first output data and the second output data to a wavefront multiplexer;
    performing a spatial transform on the first output data and the second output data, via the wavefront multiplexer, to generate a plurality of third output data; and
    inputting the third output data to a plurality of digital-to-analog converters to generate a plurality of baseband signals.

2. The method of claim 1 further comprising frequency up-converting the baseband signals.

3. The method of claim 2, further comprising combining the frequency up-converted baseband signals into an uplink signal, via a frequency domain multiplexer.

4. The method of claim 2, further comprising combining the frequency up-converted baseband signals into two signal streams corresponding to vertical linear polarization and horizontal linear polarization, respectively, via two frequency domain multiplexers.

5. The method of claim 2, further comprising combining the frequency up-converted baseband signals into two signal streams corresponding to right-hand circular polarization and left-hand circular polarization, respectively, via two frequency domain multiplexers.

6. The method of claim 3, further comprising amplifying the uplink signal via a first amplifier and radiating the amplified uplink signal to the satellite via an uplink transmit antenna.

7. The method of claim 6, further comprising:
    receiving the radiated uplink signal, via an uplink receive antenna array located on the satellite;
    amplifying the received uplink signal via a second amplifier;
    demultiplexing the amplified received uplink signal, via a frequency domain demultiplexer, to generate demultiplexed signals;
    frequency converting the demultiplexed signals to generate frequency converted signals;
    inputting the frequency converted signals to a wavefront demultiplexer;
    performing a spatial transform on the frequency converted signals, via the wavefront demultiplexer, to generate downlink signals;
    amplifying the downlink signals via third amplifiers; and
    routing the amplified downlink signals to the downlink broadcast antenna array.

8. The method of claim 1, wherein the first beam weight vector comprises a complex number.

9. The method of claim 1, wherein the first pointing direction is different from the second pointing direction.

10. The method of claim 1, wherein inputting the first output data and the second output data to a wavefront multiplexer comprises inputting the first output data, the second output data and null data to the wavefront multiplexer.

11. The method of claim 10, wherein performing a spatial transform on the first output data and the second output data comprises performing the spatial transform on the first output data, the second output data and the null data.

12. A method for generating first and second beams, comprising:
    inputting first content data to a first digital beam forming processor;
    applying, via the first digital beam forming processor, a first set of beam weight vectors to the first content data, the first set of beam weight vectors including information on a first footprint and a first pointing direction of the first beam;
    generating first output data via the first digital beam forming processor;
    inputting second content data to a second digital beam forming processor;
    applying, via the second digital beam forming processor, a second set of beam weight vectors to the second content data, the second set of beam weight vectors including information on a second footprint and a second pointing direction of the second beam;
    generating second output data via the first digital beam forming processor;
    inputting the first output data and the second output data to a wavefront multiplexer; and
    performing a Fourier transform on the first output data and the second output data, via the wavefront multiplexer, to generate a plurality of third output data.

13. The method of claim 12 further comprising:
    inputting the third output data to a plurality of digital-to-analog converters to generate a plurality of baseband signals; and
    frequency up-converting the baseband signals.

14. The method of claim 13, further comprising combining the frequency up-converted baseband signals into an uplink signal, via a frequency domain multiplexer.

15. The method of claim 13, further comprising combining the frequency up-converted baseband signals into two signal streams corresponding to vertical linear polarization and horizontal linear polarization, respectively, via two frequency domain multiplexers.

16. The method of claim 13, further comprising combining the frequency up-converted baseband signals into two signal streams corresponding to right-hand circular polarization and left-hand circular polarization, respectively, via two frequency domain multiplexers.

17. The method of claim 12, further comprising:
receiving the radiated uplink signal, via an uplink receive antenna array located on the satellite;
amplifying the received uplink signal via a second amplifier; and
demultiplexing the amplified received uplink signal, via a frequency domain demultiplexer, to generate demultiplexed signals.

18. The method of claim 12, wherein the first beam weight vector comprises a complex number.

19. The method of claim 12, wherein the first pointing direction is different from the second pointing direction.

20. The method of claim 12 wherein performing a Fourier transform on the first output data and the second output data comprises performing the Fourier transform on the first output data, the second output data and null data.

* * * * *